United States Patent [19]
Elings et al.

[11] Patent Number: 5,229,606
[45] Date of Patent: * Jul. 20, 1993

[54] JUMPING PROBE MICROSCOPE

[75] Inventors: Virgil B. Elings; John A. Gurley, both of Santa Barbara, Calif.

[73] Assignee: Digital Instruments, Inc., Santa Barbara, Calif.

[*] Notice: The portion of the term of this patent subsequent to Jun. 20, 2008 has been disclaimed.

[21] Appl. No.: 361,545

[22] Filed: Jun. 5, 1989

[51] Int. Cl.$^5$ .............................................. H01J 37/26
[52] U.S. Cl. ...................... 250/306; 250/307
[58] Field of Search ........................ 250/306, 311, 302

[56] References Cited

U.S. PATENT DOCUMENTS

| | | | |
|---|---|---|---|
| 4,618,767 | 10/1986 | Smith et al. | 250/311 |
| 4,665,313 | 5/1987 | Wells | 250/306 |
| 4,724,318 | 2/1988 | Binnig | 250/306 |
| 4,814,622 | 3/1989 | Gregory et al. | 250/306 |
| 4,823,004 | 4/1989 | Kaiser et al. | 250/306 |
| 4,902,892 | 2/1990 | Okayama et al. | 250/306 |

Primary Examiner—Jack I. Berman
Assistant Examiner—Kiet T. Nguyen
Attorney, Agent, or Firm—Donald A. Streck

[57] ABSTRACT

A microscope of the scanning probe variety. This device circumvents one of the serious problems of prior art scanning probe microscopes, i.e. that the probe is always near or on the surface of the object being scanned, creating the danger of damaging the probe on the surface especially on large scans or at high scan speeds. The microscope of this invention jumps the probe over the surface, causing the probe to be near or on the surface during only a very limited portion of the scan and therefore able to scan quickly over rough surfaces without undue damage to the probe or surface. Both scanning tunneling microscopes and atomic force microscopes employing the invention are disclosed. The scanning tunneling microscope is shown with both digital and analog control of the movement of the probe.

30 Claims, 4 Drawing Sheets

JUMPING PROBE MICROSCOPE

BACKGROUND OF THE INVENTION

This invention relates to microscopes able to display a physical property of a surface and, more particularly, to a scanning probe microscope wherein a probe tip is moved over the surface of a sample in a raster scan comprising a series of transverse scans during which data reflecting the height of the surface is gathered at a plurality of data points to be used by controlling and calculating computer means to construct an image of the topography of the surface to scanning apparatus for increasing the speed of the scan comprising jump scanning means for moving the probe tip along each of the transverse scans in a series of jumps wherein the probe tip is moved from a position adjacent the surface to a height above the surface where there is virtually no possibility that the probe tip will strike the surface when the probe tip is moved horizontally and data gathering logic means included within the computer means for gathering the data at a pre-selected portion of selected ones of the jumps.

Scanning probe microscopes are rapidly gaining popularity because of their ability to display surface features to an atomic level with what are, compared to other microscopes of such capability, simple and inexpensive devices. Typical of scanning probe microscopes are the Scanning Tunneling Microscope (STM) as described in U.S. Pat. No. 4,343,993 by Binnig and Rohrer and the Atomic Force Microscope (AFM) as described in U.S. Pat. No. 4,724,318 by Binnig et al.

In the STM, a sharp metallic tip is maintained a few atomic diameters above the surface of a conducting surface while a tunneling current flows between the tip and the surface as the tip is scanned across the surface. As stated in the independent claim of above-referenced U.S. Pat. No. 4,343,993, the tip is scanned "across the sample surface at a tunneling distance while tunneling current flows between the tip and the sample surface." Since the tunneling current flows only when the tip is within a few atomic diameters of the surface, the STM has the advantage of seeing atomic features on the surface; however, the disadvantage is that on large scans where atomic resolution is of no interest, the tip must still be a few atoms above the surface. This makes it difficult to perform large scans at a fast scanning speed since the vertical positioning system cannot respond fast enough to keep the tip from hitting the surface, causing the tip to be worn away and also damaging the surface. For example, at the present time the fastest scan velocity for an STM is 10 microns/second over a "rough" surface such as a stamper for making compact disks. At higher velocities the tip tends to be damaged. This scan rate is about 20,000 atoms per second and the feedback response is about 20 kHz. The feedback system corrects the vertical position of the tip for a horizontal motion of one atom, which is the rate required to keep the tip from running into ledges which are more than a few atoms high. Faster responding positioners and feedback loops would be needed for faster scans. On large scans, such as a 25 micron scan with 200 data points per scan, nearly 500 corrections are made to the vertical position of the tip to keep it from hitting the surface between data points of the scan. In other words, it can be appreciated that most of the scan time is not involved with obtaining the data of the height of the surface; but rather, with just getting from one data point to the next without hitting the surface. Again, the reason is that the feedback systems employed rely on a tunneling current to flow continuously in order to servo the tip above the surface; but, the tunneling occurs only when the tip is a few atoms above the surface.

As mentioned above, an Atomic Force Microscope (AFM) is another type of scanning probe microscope. This device has a sharp tip mounted on a lever and the tip is brought down into near contact, or contact, with the surface of the sample to be scanned. The force of contact is measured by the deflection of the lever, usually by a beam of light which is bounced off the lever. With a feedback system moving the tip (or, alternatively, the sample) up and down to maintain constant force, the tip is scanned across the sample. If the force is kept small, the tip will not be damaged; but, on large scans the feedback system cannot respond fast enough to keep the force small, so the scan rate becomes limited in order to not damage the tip.

Wherefore, it is an object of this invention to provide a scanning probe microscope which can scan rapidly and accurately without fear of damaging the scanning probe or the sample.

It is another object of this invention to provide a scanning probe microscope which can scan rapidly and accurately without fear of damaging the scanning probe or the sample by scanning the probe over the surface of the sample in a series of hops or jumps rather than dragging the probe tip over the surface.

Other objects and benefits of the invention will become apparent from the description which follows hereinafter when taken in conjunction with the drawing figures which accompany it.

SUMMARY

The foregoing objects have been achieved in a scanning probe microscope wherein a probe tip is moved over the surface of a sample in a raster scan comprising a series of transverse scans during which data reflecting the height of the surface is gathered at a plurality of data points to be used by controlling and calculating computer means to construct an image of the topography of the surface, by the scanning apparatus of the present invention for increasing the speed of the scan comprising jump scanning means for moving the probe tip along each of the transverse scans in a series of jumps wherein the probe tip is moved from a position adjacent the surface to a height above the surface where there is little possibility that the probe tip will strike the surface when the probe tip is moved horizontally and data gathering logic means included within the computer means for gathering the data at a pre-selected portion of selected ones of the jumps.

In the preferred embodiment, the jump scanning means comprises, means for lifting the probe tip from a position adjacent the surface to a height above the surface where there is little possibility that the probe tip will strike the surface when the probe tip is moved horizontally; means for moving the probe tip horizontally to a next position; and, means for lowering the probe tip from the raised position to a position adjacent the surface. Preferably the means for lifting the probe tip from a position adjacent the surface to a height above the surface is a high gain means and the means for lowering the probe tip from the raised position to a position adjacent the surface is a low gain means whereby the probe tip is lifted from the surface rapidly and lowered towards the surface slowly to avoid damage to the probe tip by striking the surface.

In one version of the invention, the scanning probe microscope is a scanning tunneling microscope wherein the means for lowering the probe tip from the raised position to a position adjacent the surface comprises, means for lowering the probe tip towards the surface; means for sensing a tunneling current flowing between the probe tip and the surface before the probe tip touches the surface; and, means for stopping the lowering of the probe tip towards the surface when the tunneling current reaches a pre-established threshold amount. In one variation, the means for stopping the lowering of the probe tip towards the surface when the tunneling current reaches a pre-established threshold amount comprises means for stopping the lowering of the probe tip towards the surface when the flow of a tunneling current is detected, wherein additionally the means for gathering the data at selected ones of the next positions includes means for adjusting data reflecting the height of the probe tip above the surface as a function of the amount of tunneling current flowing between the probe tip and the surface. In another variation, the means for lowering the probe tip towards the surface comprises means for lowering the probe tip towards the surface at a first rate until a tunneling current is detected and means for continuing to lower the probe tip towards the surface at a second rate which is slower than the first rate, wherein the means for stopping the lowering of the probe tip towards the surface when the tunneling current reaches a pre-established threshold amount comprises means for stopping the lowering of the probe tip towards the surface when the tunneling current reaches a value placing the probe tip at a pre-established known constant height above the surface.

A preferred addition for further increasing the speed of the scan comprises the means for lifting the probe tip from a position adjacent the surface to a height above the surface where there is little possibility that the probe tip will strike the surface when the probe tip is moved horizontally comprising means for saving data for preceding data points; means for at each point where the probe tip is to be lifted looking at the saved data for adjacent points in the present and preceding transverse scan; means for using the preceding data points near the present point to calculate the height to be cleared in moving the probe tip to a next point; and, means for lifting the probe tip to a height which will clear the approximate height.

The preferred means for moving the probe tip horizontally to a next position comprises means for moving the probe tip at a fixed average speed. It may also comprise means for checking the data to see if the surface is rising or falling in the direction the probe tip is moving and means for moving the probe tip vertically a larger distance when the surface is rising than when it is falling.

The means for lifting the probe tip may lift the probe tip vertically without simultaneously moving the probe tip horizontally and while the means for moving the probe tip horizontally and for lowering the probe tip operate simultaneously whereby the probe tip has a triangular trajectory at each jump. Alternatively, the means for lifting the probe tip, for moving the probe tip horizontally, and for lowering the probe tip may all operate simultaneously whereby the probe tip has a generally curved trajectory at each jump.

In a digital version, the means for raising and for lowering the probe tip comprises, positioner means carrying the probe for selectable vertical and horizontal movement; sensor means for sensing a tunneling current flowing between the probe tip and the surface and for developing a digital signal reflecting the tunneling current; and, digital controller means connected to receive the digital signal and to cause the positioner means to move the probe vertically and horizontally to create the jumps.

In an analog version, the means for raising and for lowering the probe tip comprises, positioner means carrying the probe for selectable vertical and horizontal movement; sensor means for sensing a tunneling current flowing between the probe tip and the surface and for developing an analog signal reflecting the tunneling current; scan control means connected to the positioner means for causing the positioner means to move the probe horizontally to create the transverse scans; analog controller means connected to receive the analog signal and for causing the positioner means to move the probe vertically; and, clock means connected to the scan control means and the analog controller means for causing the scan control means and the analog controller means to move the probe tip horizontally and vertically in combination to create the jumps. In this approach, the preferred analog controller means comprises, integrator means for applying a ramp voltage to the positioner means whereby the probe tip is moved linearly towards the surface; pulse charge means for resetting the integrator means whereby to lift the probe tip from the surface; and, optionally, switch means disposed in a feedback loop of the integrator means to halt integration by the integrator means whereby to hold the probe tip at a fixed vertical position with respect to the surface. It also includes comparator means connected to sense tunneling current between the probe tip and the surface and the pulse charge means for resetting the integrator means and thereby lifting the probe tip from the surface when the tunneling current indicates that the probe tip is near the surface.

In another version of the invention, the scanning probe microscope is an atomic force microscope wherein the probe tip is mounted on a bendable arm and including means for moving the sample with respect to the probe tip to cause the scanning of the surface by the probe tip, wherein the means for lowering the probe tip from the raised position to a position adjacent the surface comprises, means for decreasing the relative distance between the surface and the probe tip; means for sensing the bending of the arm; and, means for stopping the decrease of the distance between the sample surface when the bending of the arm reaches a pre-established threshold amount. In one version of this embodiment, the sample is moved and the means for stopping the raising of the sample surface when the bending of the arm reaches a pre-established threshold amount comprises means for stopping the raising of the sample surface towards the probe tip when any bending of the arm is detected, wherein the means for gathering the data at selected ones of next positions includes means for adjusting data reflecting the height of the sample as a function of the amount of bending of the arm. In another version, the means for stopping the raising of the sample surface when the bending of the arm reaches a pre-established threshold amount comprises means for raising the sample surface towards the probe tip at a first rate until any bending of the arm is detected and means for continuing to raise the sample surface towards the probe tip at a second rate which is slower than the first rate, wherein the means for stopping the raising of the sample surface when the bending of the arm reaches a pre-established threshold amount comprises means for stopping the raising of the sample surface when the bending of the arm reaches a value placing the probe tip at a pre-established known constant force on the surface.

DESCRIPTION OF THE PREFERRED EMBODIMENT

Figure 1:
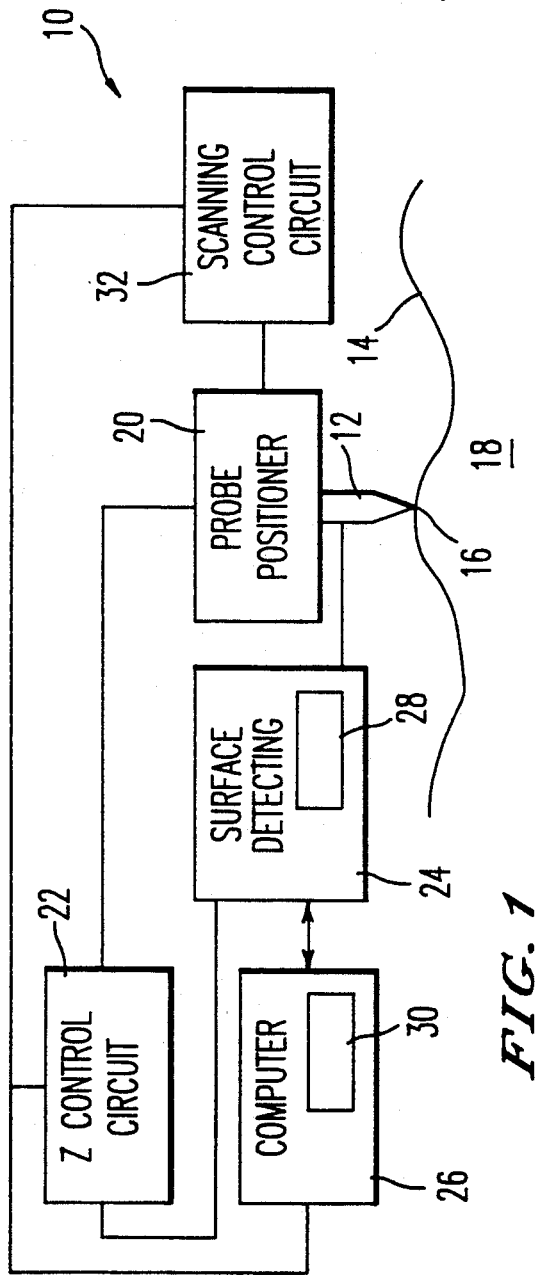
FIG. 1 is a simplified block diagram of a scanning probe microscope incorporating the present invention.
Figure 2:
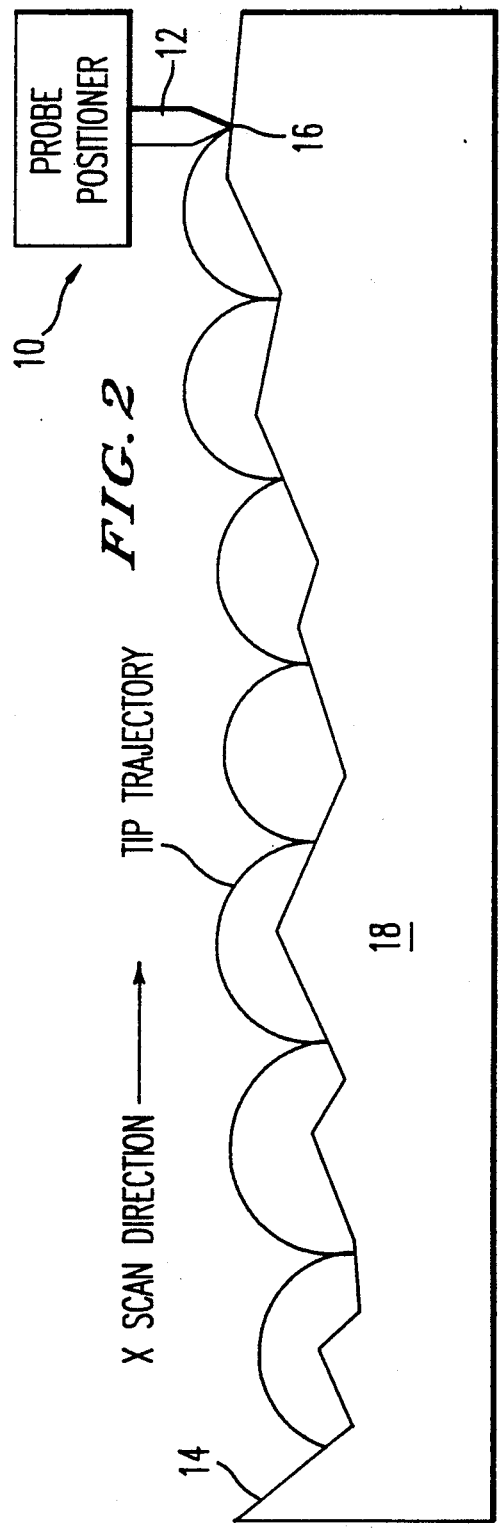
FIG. 2 is a simplified drawing showing a possible trajectory for the probe tip across the surface of a sample when operating according to the present invention.
Figure 3:
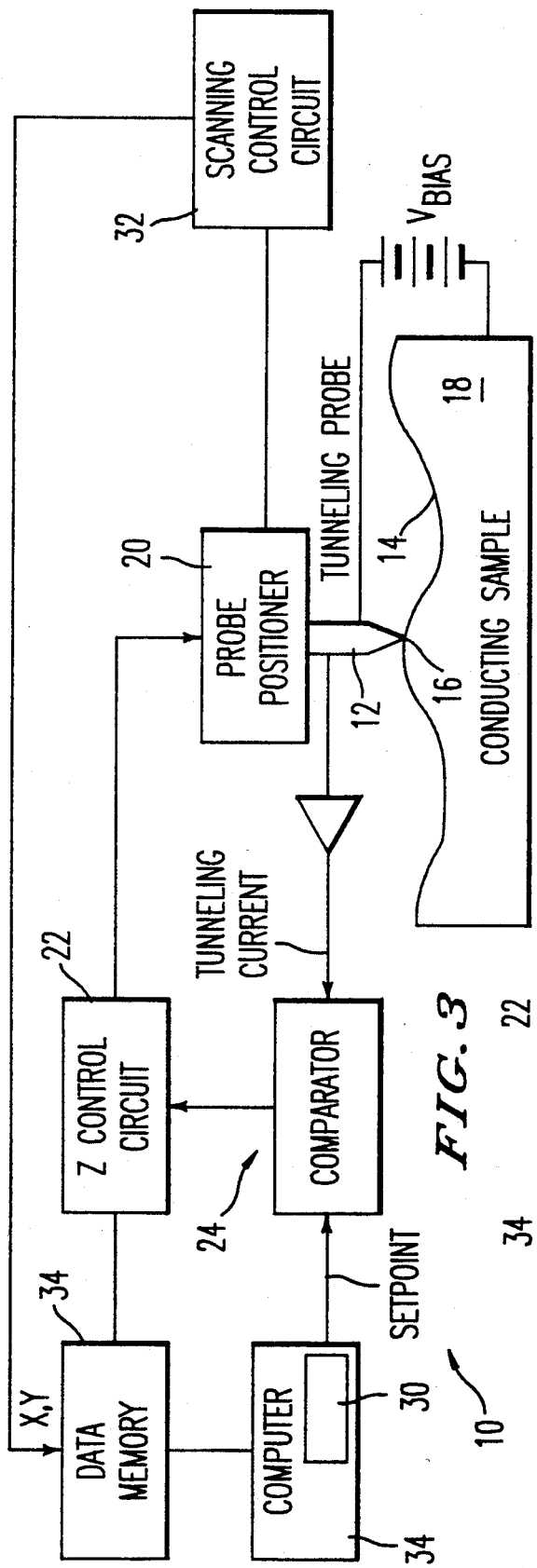
FIG. 3 is a simplified functional block diagram of a scanning tunneling microscope incorporating the present invention.

The scanning probe microscope of this invention, which the inventors have named the Jumping Probe Microscope (JPM), which is generally indicated as 10 in the drawings, operates by having the probe 12 move over the surface 14 being scanned in a series of jumps where the height of the surface 14, or some other property such as magnetic field (i.e., the data) is determined at a specific point in the jump, usually the beginning or end. FIG. 1 shows a block diagram of the JPM 10 and FIG. 2 shows schematically how the tip 16 of the probe 12 might move over the surface 14. FIG. 3 is an STM version of the JPM. In this embodiment, the tunneling current between the tip 16 and surface 14 is the medium employed for detecting the surface 14 with the probe 12. This current is only detectable when the end of the tip 16 is within 2.0 nanometers of the surface 14 (about 5 atoms). The JPM 10 operates with the relative position of the tip 16 and sample 18 being controlled by a three-dimensional positioner 20 of a type well known in the art for such applications, with either the tip 16 or sample 18 (or both) being moved. In X and Y, the horizontal directions, the tip 16 is moved by the scanning control circuitry 32 in a raster scan, faster in X than in Y, to trace out frames of data, much like an image is traced out on a television screen. This horizontal motion can be continuous or in steps. In the vertical direction, the tip 16 is preferably controlled by the piezoelectric positioner 20 which is, in turn, controlled by a control circuit 22 which controls the motion of the tip 16 in Z, i.e. the vertical direction. Typically and preferably, the trajectory of the tip 16 is one which will quickly lift the tip 16 away from the surface 14 and then bring it back down as the tip 16 is moving in the X direction. All the time, the surface detecting electronics 24 are looking for a threshold tunneling current which indicates that the tip 16 is within about 2.0 nanometers of the surface 14. When this occurs as detected by the comparator 38, the X and Z positions of the tip 16 are recorded in the data storage memory 34 and the tip 16 is then be lifted up into another up-and-down trajectory. Note that it is not necessary that the trajectories all be a constant distance in X since the computer 26 can sort the data from memory 34 out later and interpolate to make an X-Y grid of surface 14 height; in fact, it would occur that the spacing in X between the data points is closer for a surface 14 that is rising in X than for a surface 14 falling in X if the trajectories have the same shape. If the horizontal motion is continuous, which it can be, on very steep surfaces, the tunneling current may be detected again as the tip is being raised and the tip can be raised again before it is lowered. That is, the raising could occur in several steps before the tip is lowered when the tip is going up a steep feature on the surface. If the scan is continuous and linear in X, the time at which a tunneling current between the tip 16 and surface 14 occurs (because the tip 16 is near the surface 14) gives the position of the tip 16 in X. The position in Y is usually assumed to be constant during one scan line and can be either a continuous slow motion or incremented at the end of each scan line, as desired by the implementor. The increment could be a jump, or series of jumps, as is done in the X direction. Typically, there will be more jump data points than the number of points in the image so that each image data point can be an average or just one of the jump data points which have occurred from the last image data point.

Because of nonlinearities in the positioner 20 (which as mentioned earlier is preferably a piezoelectric device), the inventors herein have found that it is best to raise the tip 16 on each jump only enough to clear the surface 14 until the next touchdown on the surface 14. Also, for reasons of speed, the tip 16 should not be moved excessively since it takes a finite time to start and stop the motion. This start and stop time increases when the motion increases. A typical positioner 20 might have a vertical sensitivity of 10 nanometers/volt of applied voltage and the maximum voltage available might be 300 volts. The jump voltage to move the tip 16 off the surface 14 would be a small fraction of this 300 volts, say only about 1 volt, which would lift the tip 16 10 nanometers off the surface 14, about five times the normal tip to surface distance for an STM. This height for the preferred embodiment is controlled by a digital signal processor 28 within the surface detecting electronics 24 which is, in turn, controlled by software 30 in the computer 26 that the user can manipulate to vary operation according to the circumstances in order to get optimum performance. Thus, for example, the jump height can be varied to suit the surface 14 being scanned, being larger for rougher surfaces.

The vertical resolution of the height measurement of the surface 14 is much better than the jump height since the data of the height of the surface 14 is obtained only at a particular point in the jump, say when the tip 16 comes near the surface and a tunneling current is established, i.e. only at the end of the trajectories. This tunneling current occurs only when the tip 16 is a few nanometers from the surface 14; so, the resolution is a few nanometers if the height of the tip 16 is recorded when a tunneling current occurs, over a wide range of currents. For higher resolutions, it is preferable that the tunneling current be the same at each data point to give a topography measured at constant tunneling current as is now done in present STMs. It is not necessary that the tip 16 be brought down to this particular height above the surface 14 since the height data obtained at any tunneling current can be corrected mathematically by the computer 26 to a height at some other tunneling current. The variation of the tunneling current with height can be measured by the JPM 10 simply by moving the tip 16 off the surface 14 in small steps and recording the current. During the jumping motion, the tip 16 can be brought down in fairly large steps, say one nanometer, in order to increase the speed. Since the tunneling current varies substantially over this distance, the current detected, when it occurs, will not be the same for each data point. Using the tunneling current versus height data, the height can be corrected to a fixed tunneling current by the computer 26, giving a vertical height resolution much better than one nanometer, even though the tip 16 is brought down in steps of one nanometer. Higher speeds could be obtained by having the tip 16 move down in fairly large steps, stop when a tunneling current is detected, and then using the magnitude of the tunneling current to correct the height to a fixed current to obtain a high resolution constant current topography.

An alternate way of operating the JPM is to not synchronize the data taking with the jump trajectory, but to oversample the data so that several sampling data points per jump, or per image point, are taken. The actual data point which is used could then be the lowest value or most negative of these sampling data points so that the actual data is the lowest point in the trajectory of each jump. This method has also been implemented by the inventors using a high speed digital signal processor to take in the sampling data points and find the lowest point to use as the actual data point. This is not as satisfactory as sampling the data at the bottom of each trajectory but is simple to implement in some systems and is a major improvement over standard feedback systems.

As those skilled in the art will readily recognize and appreciate, the above-described feedback system for the Jumping Probe Microscope 10 is quite different from that of prior art Scanning Probe Microscopes where the attempt is made to have the probe 12 scan along and follow the surface 14. Instead of a feedback system that servos the height of the tip 16 to avoid oscillation, as in the SPM, the feedback system of the JPM 10, in a sense, oscillates the tip 16 up and down near the surface 14 but in a very intelligent way such that the surface 14 height can be determined at the end of each oscillation so that the resolution of the device is much better than the size of the oscillations. By contrast, in an SPM, the feedback system operates with a feedback gain which is low enough that the probe 12 will not oscillate in Z. This low gain causes the tip 16 to strike the surface 14 and also gives the instrument poor resolution. But, to follow the surface 14, the feedback needs to have a gain high, just on the edge of oscillation. In the JPM 10 of this invention, the oscillation is "designed in" in such a way that the tip 16 does not strike the surface 14 and the resolution is much smaller than the size of the oscillation. The "gain" of the system when the tip 16 is near the surface 14 can now be very high to give a fast response, with the vertical oscillation not contributing noise to the data.

The Jumping Probe Microscope 10 of this invention typically uses an asymmetric gain in which a high gain, or high speed motion, is used for raising the tip 16 and a low gain, or low speed motion, is used for lowering it. The bottom envelope of the oscillations is used as the height data for the surface 14 so that the oscillations themselves do not appear as noise in the data, as happens in normal systems. This is much different than including the oscillations in the data and then filtering to obtain a mean since in that case the lateral resolution would be decreased by the filtering, giving an image with little detail. In the JPM 10, no filtering of the data is needed and the lateral resolution is good to one jump of the probe 12.

In tested embodiments, the inventors herein have operated the JPM 10 in the mode of a very high gain non-linear feedback system where as soon as the tunneling current exceeds a threshold, the height of the tip 16 is recorded in memory 34 and a large gain is applied to the vertical positioner 20 of the tip 16 to lift the tip 16. When the tunneling current, or error signal, goes below some threshold, a smaller gain is applied to bring the tip 16 down to the surface 14 in a controlled (and safe to both the probe 12 and surface 14) manner. This results in the tip being jerked away from the surface quickly and then brought down at a slower rate to produce an arc-like trajectory.

On a very steep surface, such as etched lines on an integrated circuit, several up motions may occur before the tip comes down, i.e. an up motion occurs whenever a tunneling curent is detected, even if the tip is already going up. This could happen in a device where the up and horizontal motions occur simultaneously. In a scan where, say 200 data points per scan are desired, there may be several jumps per data point. Accordingly, in such cases the inventors herein take the lowest point (or an average of the jump data points) to form an image data point. If, for some reason, the tip 16 did not come back down to the surface 14 between image data points, the image data point is taken as being the average of the last data point and the next one, i.e. the computer 26 is used to interpolate the missing data point. The inventors have found that the frequency of this happening can be decreased by raising the downward gain of the motion and lowering the upward gain.

Figure 4:
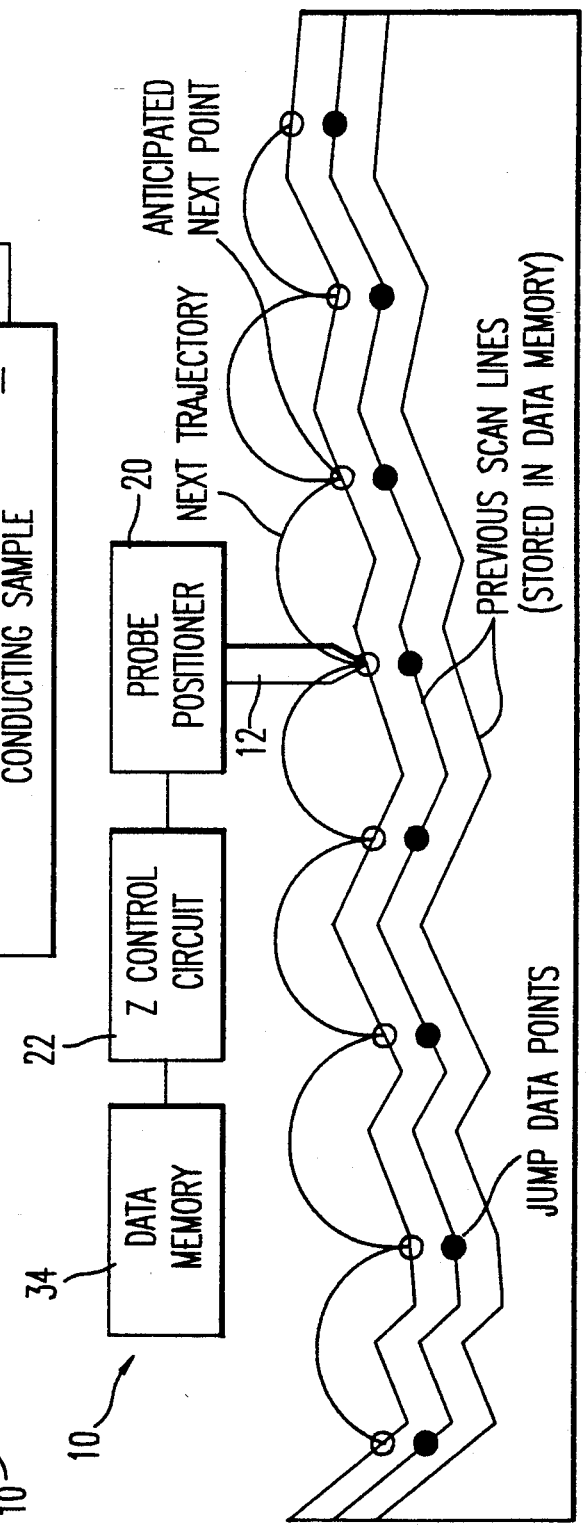
FIG. 4 is a simplified drawing depicting a technique employed for maximizing the speed of the scan when employing the present invention by employing adjacent scan line data to pick a minimum safe height to lift the probe during each jump.
Figure 6:
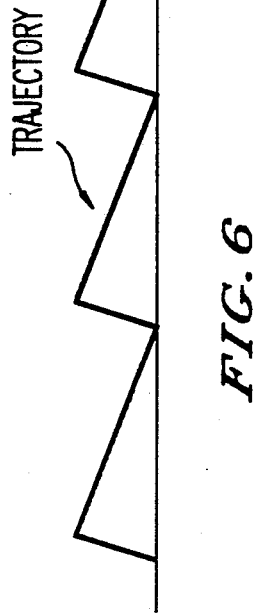
FIG. 6 is a simplified drawing of a simple triangular trajectory which can be employed for the jumps if desired.

While in the tested embodiment the operator adjusts the jump height through the software 30 as mentioned above, if desired, the computer 26 of the JPM 10 itself could adjust the jump height to match the sample 18, data point by data point, by using data from the present and/or previous scan line or scan frame to anticipate the topography of the surface 14. FIG. 4 shows how this could be done. The height of the surface 14 of the sample 18 being scanned as measured from the present or previous scan line or lines is stored in memory 34. Since the topgraphy is similar from one scan line to the next, the data from the previous scan line(s) can be used to calculate the anticipated height of the next data point. This can be done simply by using the height of the corresponding data point from the previous scan line. In the alternative, one could calculate the slope of the topography in X and Y from previous data points on scan lines and then extrapolate, from the current data point, the change in height to the next data point. This anticipated value of the height of the next point can then be used by the above-described control circuit components of the JPM 10 to choose the trajectory for the next jump so that the tip 16 will avoid the surface 14, but not excessively, on the way to the next data point. For example, if the surface 14 is sloping downward, the trajectory can be more shallow than if the surface 14 is sloping upwards, as shown in FIG. 6. The different trajectories that the tip 16 goes through could be looked up from a table or could be calculated from a formula (as simple as just a variable height jump which depends on previous topography). Such techniques are well known to those skilled in the art and, therefore, will not be described in any detail in the interest of simplicity and the avoidance of redundancy. Again, remembering that excessive motion is lost time, the intent is that the JPM 10 learn from previous data how to jump the tip 16 to the next data point so that excessive motion does not occur. In this manner, large rises in the surface 14 can be anticipated and the trajectory chosen to not collide the tip 16 with the surface 14, even on high speed scans.

Figure 5:
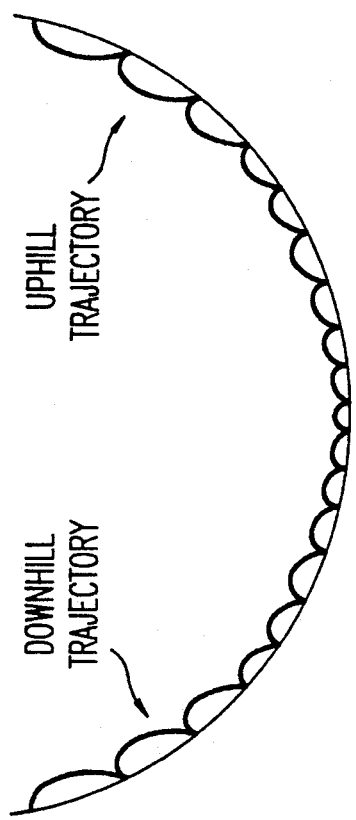
FIG. 5 is a simplified drawing depicting how the quasi-parabolic jump trajectory could change depending on whether the surface is falling, flat, or rising.

On the other hand, if desired, the trajectory can be made quite simple. After each data point is recorded in the memory 34 by the computer 26, the tip 16 can be moved up by a fixed step in Z, horizontally by a fixed step in X, and then lowered until a tunneling current is detected, the Z position recorded, and then the process started all over. These motions could overlap in time. At the end of each scan line, the Y position can be incremented by a fixed amount, or Y can be slowly varied during each scan line. The inventors have found in their tests that it is best that the steps in X be done at a constant rate, otherwise the creep of the piezoelectric positioner 20 will affect the image. This creep is such that if the rates of X motion on two scan lines are different, the data from the two lines will not match up in the image. In the above trajectory, as depicted in FIG. 5, the series of events of lifting the tip 16, moving in X, lowering the tip 16, detecting tunneling, and recording the height of the surface 14 should preferably occur at a constant rate along each scan line. The JPM can be operated with the horizontal motion being continuous instead of in steps.

Figure 7:
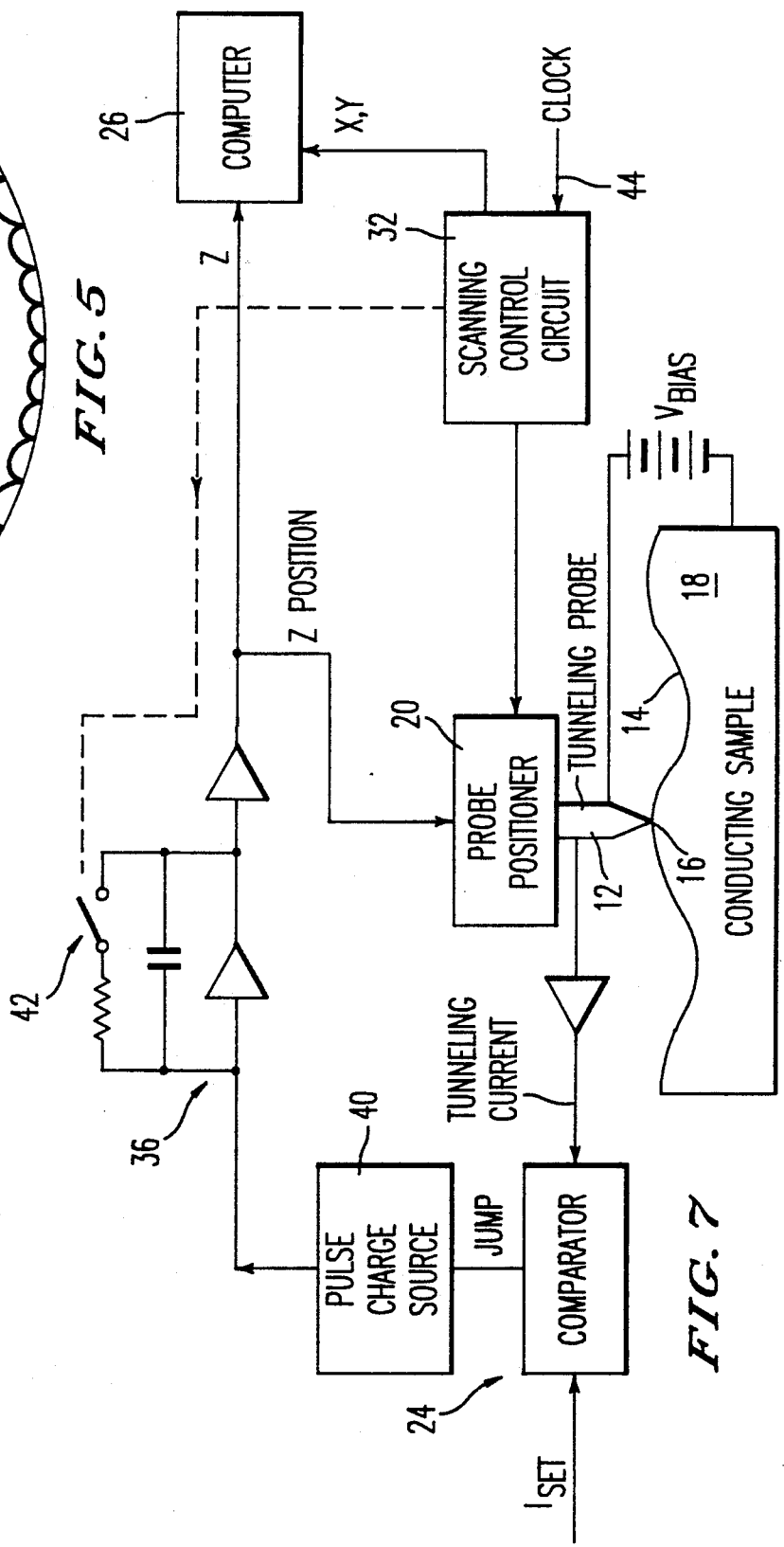
FIG. 7 is a simplified functional block diagram of analog probe positioning apparatus for a scanning tunneling microscope incorporating the present invention.

The trajectory could also be done using analog electronics for the vertical positioning of the tip 16 as shown in FIG. 7. The Z (vertical) position of the tip 6 is controlled by an integrator 36 in which a current is leaked off at a rate controlled by the user to lower the tip 16. When the tip 16 is close enough to the surface 14 for a tunneling current to flow from the surface 14 of the sample 18 to the tip 16 and be sensed by the comparator 38, the height of the tip 16 (Z control voltage) is recorded and the tip 16 raised by a charge pulsed into the integrator 36 from source 40. The amount of this charge can be user-controlled to control the height the tip 16 is raised. At the same time, the current leakage is stopped by opening the switch 42 so that the tip 16 remains above the surface 14. A clock, running at some pre-established rate, is input at 44 and moves the tip 16 in the X direction and also starts lowering the tip 16 by closing the switch which leaks charge from the integrator 36, and then the foregoing series of events repeats. After a certain number of increments in the X direction, Y is incremented and the scan in X is reversed. In this way, the tip 16 is scanned in a raster fashion across the surface 14 with data giving the height of the surface 14 each time the tip 16 comes within tunneling distance of the surface 14. Alternately, without the clock the tip 16 could be moved continuously in X with jump data points being recorded each time a tunneling current is detected and the data collection system, usually and preferably the computer 26, could make an image array out of the unequally spaced jump data points. At each data point the computer could record X, Y and Z to produce an image of the surface. An analog JPM could be operated with a nonlinear feedback system in which the gain is large whenever the tunneling current or error signal is above some threshold, and is smaller whenever the tunneling current or error signal is below some threshold.

Figure 8:
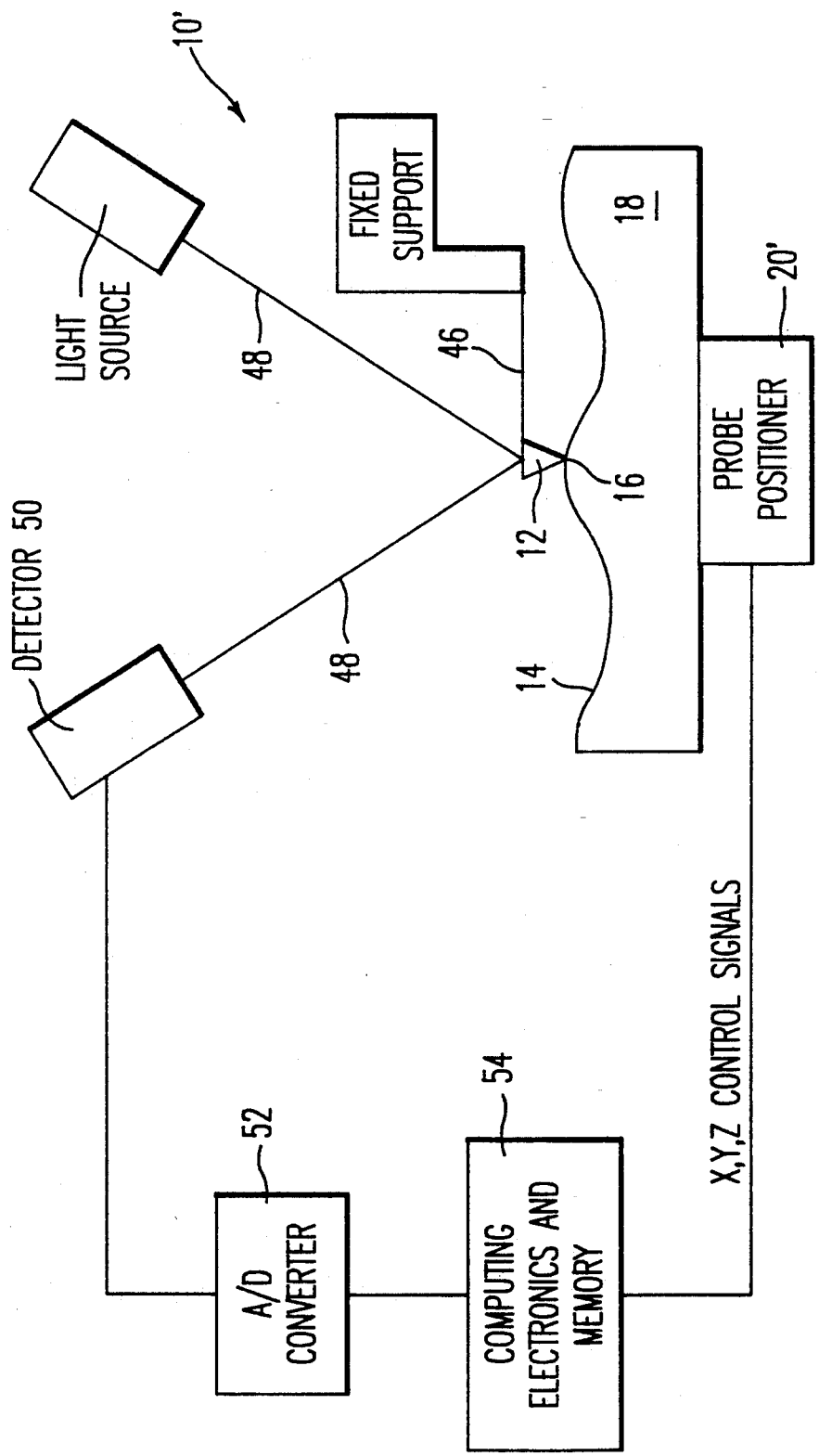
FIG. 8 is a simplified functional block diagram of the probe positioning apparatus of an atomic force microscope incorporating the present invention.

An atomic force microscope version of the Jumping Probe Microscope 10 of this invention is shown in FIG. 8, where it is generally indicated as 10'. In this embodiment, the sample 18 is scanned in X and Y and servoed in Z while the bending of the arm 46 which holds the tip 16 is detected by the deflection of a beam of light 48 bounced off the back of the arm 46 to detector 50. One could also use optical interference to determine the bending of the arm 46 or a detector such as a strain gauge built onto the arm 46. The output of the detector 50 (which is an analog signal reflecting the position of the beam of light 48 on the surface of the detector and, therefore, the angle of reflection of the beam of light 48 as related to the bending of the arm 46) is converted to a digital signal in the A/D converter 52. The digital value of the bending of the arm 46 from the A/D converter 52 is then input to computing electronics and memory substantially as described above with respect to the previous embodiment (generally indicated by box 54) which provides the necessary X, Y, and Z control signals to a piezoelectric positioner 20' used to scan the sample 18 with respect to the stationary probe 12.

In an atomic force microscope, no tunneling current flows and the tip 16 is actually touched to the surface 14 of the sample 18, which has the advantage that the surface 14 being scanned can be of an electrically insulating material. The force between the tip 16 and surface 14 is measured by the bending of the arm 46 which holds the tip 16. This is done by measuring the deflection of the beam of light 48 by the detector 50. In this arrangement, the sample 18 is scanned across the tip 16 and the tip 16 is stationary.

As can be appreciated, because it actually touches the surface 14 being scanned, the AFM is even more sensitive to tip 16 damage than the STM. Accordingly, the jumping of the tip 16 on the surface 14 according to the techniques of the present invention will greatly help for large scans. In operation, the sample 18 is raised toward the tip 16 by the positioner 20' until the force of contact reaches a certain value, at which time the height of the sample 18 (vertical control signal) is recorded and the sample 18 moved away from the tip 16 and also moved in the X direction in order to repeat the sequence and obtain another data point. The foregoing jump scan process then continues, producing a raster scan of the surface 14 with the tip 16 touching the surface 14 at each data point where the height of the surface 14 is recorded.

In present AFM's, when looking at samples which are loose, such as DNA on a flat surface, the probe tends to push the sample around. The present JPM invention will minimize this problem by "poking" at the sample instead of "brushing" it to determine the shape of the sample. Note that it is also possible to operate the AFM in the so-called "attractive" mode, where the tip 16 is positioned close to the surface 14 and is attracted to the surface 14 by the Van der Wahls force, bending the arm 46 down instead of up as in the previously described "repulsive" mode. In the attractive mode, the tip 16 does not touch the surface 14; but, it is desirable to position the tip 16 very close to the surface 14 to get good spatial resolution. In this mode of operation, the surface 14 is brought close to the tip 16 and the arm 46 bends down as the tip 16 is attracted to the surface 14. Then, at some predetermined bending of the arm 46, the height of the sample 18 is recorded and the sample 18 then moved away from the tip 16 and moved in X to repeat the sequence. Such attractive mode microscopes can, for example, use a ferromagnetic tip 16 to map out the magnetic attractions, and therefore magnetic fields, over the surface 14 of a sample 18. If the arm holding the tip were instrumented with a strain gauge or piezoelectric gauge, or the like, to detect the bending of the arm, then the arm could be scanned back and forth, as in the STM, over a stationary sample.

Thus, it can be seen that the present invention has met its stated objectives by providing a new approach to scanning probe microscopes which provides the benefits thereof in the various approaches to such devices presently known in the art. It is also anticipated that its benefits will be equally applicable to variation in the art of scanning probe microscopes presently under development and, as yet, unavailable commercially.

Wherefore, having thus described our invention, what is claimed is:

1. In a scanning probe microscope wherein a probe tip is moved over the surface of a sample in a scan pattern comprising a series of transverse scan lines during which data reflecting a physical property of the surface is gathered at a plurality of data points to be used in constructing an image of the physical property of the surface, the method of scanning with increased speed comprising the steps of:
   a) moving the probe tip along each of the transverse scan lines in a series of jumps wherein the probe tip moves continuously in a lateral direction and each jump comprises,
      a1) determining from surface information from a preceding scan a height above the surface to which the probe tip can be raised which is sufficiently high that the chance of the probe tip striking the surface during movement of the probe tip to a next lateral position is virtually nil,
      a2) lifting the probe tip from a position adjacent the surface to the height above the surface determined in step (a1),
      a3) simultaneously moving the probe tip laterally to a next position, and
      a4) lowering the probe tip from the raised position to a position adjacent the surface.

2. The method of moving the probe tip in a scanning probe microscope of claim 1 and additionally including the step of:
   gathering data about the surface asynchronously to vertical motion of the probe tip.

3. The method of moving the probe tip in a scanning probe microscope of claim 1 and additionally including the step of:
   a) said step of gathering the data comprises gathering a multiple number of data points during each jump; and additionally comprising the step of,
   b) using only the data point closest to the surface of the multiple data points gathered during each jump to construct the image.

4. The method of moving the probe tip in a scanning probe microscope of claim 1 wherein the steps thereof include the steps of:
   a) saving data from previous data points;
   b) at each point where the probe tip is to be lifted looking at the saved data at points near the present point;
   c) using the data from the previous nearby points to determine the height to be cleared in moving the probe tip to a next point; and
   d) lifting the probe tip to a height which will clear the approximated height from step (c).

5. The method of moving the probe tip in a scanning probe microscope of claim 1 wherein said step of simultaneously moving the probe tip laterally to a next position comprises:
   moving the probe tip laterally at a constant average speed.

6. The method of moving the probe tip in a scanning probe microscope of claim 1 wherein the steps thereof include the steps of:
   a) checking surface data gathered to see if the surface is rising or falling in the lateral direction the probe tip is moving; and,
   b) lifting the probe tip vertically at least one of a larger distance or at a faster rate when the surface is rising than when it is falling.

7. In a scanning probe microscope wherein a probe tip is moved over the surface of a sample in a scan comprising a series of transverse scans during which data reflecting a physical property of the surface is gathered at a plurality of data points to be used by controlling and calculating computer means to construct an image of the physical property of the surface, scanning apparatus for increasing the speed of scanning comprising:
   a) jump scanning means for moving the probe tip along each of the transverse scans in a series of jumps wherein simultaneously with moving the probe tip laterally the probe tip is moved from a position adjacent the surface to a height above the surface that is safe for that jump and where there is virtually no possibility that the probe tip will strike the surface when the probe tip is moved horizontally on that jump;
   b) data gathering logic means included within the computer means for gathering the data at said jumps or portion of said jumps; and,
   c) height determination logic means included within the computer means for determining said safe height from previously gathered data about topography of the surface in the area of next lateral movement of the probe tip.

8. The apparatus for moving the probe tip in a scanning probe microscope of claim 7 wherein said height determination logic means comprises:
   a) means for saving data from previous data points;
   b) means for at each point where the probe tip is to be lifted looking at the saved data at adjacent points in the preceding data; and,
   c) means for using the data from the adjacent points in the preceding data to calculate said safe height to be cleared in moving the probe tip to a next point.

9. The apparatus for moving the probe tip in a scanning probe microscope of claim 7 wherein:
   said height determination logic means uses the height of the adjacent point in the preceeding scan line as said safe height to be cleared.

10. The apparatus for moving the probe tip in a scanning probe microscope of claim 7 wherein said jump scanning means includes:
   means for moving the probe tip laterally at a constant average speed.

11. The apparatus for moving the probe tip in a scanning probe microscope of claim 7 wherein said height determination logic means includes:
   a) means for checking the data to see if the surface is rising or falling in the lateral direction the probe tip is moving; and,
   b) means for lifting the probe tip vertically a larger distance when the surface is rising than when it is falling.

12. The apparatus for moving the probe tip in a scanning probe microscope of claim 7 wherein:
   said data gathering logic means gathers data asynchronously to vertical motion of the probe tip.

13. The apparatus for moving the probe tip in a scanning probe microscope of claim 7 wherein:
   said jump scanning means moves the probe tip vertically and laterally simultaneously in combination so that the probe tip has a generally curved trajectory at each jump.

14. In a scanning probe microscope wherein a probe tip is moved over the surface of a sample in a scan pattern comprising a series of transverse scan lines during which data reflecting a physical property of the surface is gathered at a plurality of data points to be used in constructing an image of the physical property of the surface, the method of scanning with increased speed comprising the steps of:
   a) moving the probe tip along each of the transverse scan lines continuously in a lateral direction; and,
   b) while moving the probe tip along each of the transverse scan lines in a lateral direction, creating a series of jumps by the probe tip by the steps of,
   b1) determining from surface information a height above the surface to which the probe tip can be raised which is sufficiently high that the chance of the probe tip striking the surface during movement of the probe tip to a next lateral position is virtually nil,
   b2) lifting the probe tip from a position adjacent the surface to the height above the surface determined in step (b1), and
   b3) lowering the probe tip from a raised position to a position adjacent the surface.

15. The method of moving the probe tip in a scanning probe microscope of claim 14 wherein said step (b1) of determining from surface information a height above the surface to which the probe tip can be raised comprises:
   determining said height from topographical data from a preceding scan line.

16. The method of moving the probe tip in a scanning probe microscope of claim 14 wherein said step (b1) of determining from surface information a height above the surface to which the probe tip can be raised comprises:
   determining said height as a function of the slope of the surface directly beneith the present location of the probe tip.

17. The method of moving the probe tip in a scanning probe microscope of claim 14 wherein:
   a distance moved by the probe tip in step (b3) between the raised position and the position adjacent the surface is small as compared to a total vertical movement potential of the probe tip.

18. The method of moving the probe tip in a scanning probe microscope of claim 14 and additionally including the steps of:
   a) gathering the data by gathering a multiple number of data points during each jump; and,
   b) using only the data point closest to the surface of the multiple data points gathered during each jump to construct the image.

19. The method of moving the probe tip in a scanning probe microscope of claim 14 wherein the steps thereof include the steps of:
   a) saving data from previous data points;
   b) at each point where the probe tip is to be lifted looking at the saved data at points near the present point;
   c) using the data from the previous nearby points to determine the height to be cleared in moving the probe tip to a next point; and,
   d) lifting the probe tip to a height which will clear the approximated height from step (c).

20. The method of moving the probe tip in a scanning probe microscope of claim 14 wherein said step of simultaneously moving the probe tip laterally to a next position comprises: moving the probe tip laterally at a constant average speed.

21. The method of moving the probe tip in a scanning probe microscope of claim 14 wherein the steps thereof include the steps of:
   a) checking surface data gathered to see if the surface is rising or falling in the lateral direction the probe tip is moving; and,
   b) lifting the probe tip vertically at least one of a larger distance or at a faster rate when the surface is rising than when it is falling.

22. In a scanning probe microscope wherein a probe tip is moved over the surface of a sample in a scan pattern comprising a series of transverse scan lines during which data reflecting a physical property of the surface is gathered at a plurality of data points to be used in constructing an image of the physical property of the surface and the physical property is used as an input to a variable-gain feedback loop controlling the vertical position of the probe tip, the method of scanning with increased speed comprising the steps of:
   a) moving the probe tip along each of the transverse scan lines continuously in a lateral direction; and,
   b) while moving the probe tip along each of the transverse scan lines in a lateral direction, creating a series of jumps by the probe tip by varying the gain of the feedback loop as a function of the vertical position of the probe tip with respect to the surface and the physical property of the surface; and,
   c) gathering the data as the probe moves.

23. The method of moving the probe tip in a scanning probe microscope of claim 22 wherein said step of creating a series of jumps by the probe tip includes the step of:
   determining a gain function from surface information.

24. The method of moving the probe tip in a scanning probe microscope of claim 23 wherein said step of determining the gain from surface information comprises:
   determining the gain function from topographical data from a preceding scan line.

25. The method of moving the probe tip in a scanning probe microscope of claim 23 wherein said step of determining the gain from surface information comprises:

determining the gain function as a function of the slope of the surface directly beneith the present location of the probe tip.

26. The method of moving the probe tip in a scanning probe microscope of claim 23 wherein:
   a distance moved by the probe tip between the raised position and the position adjacent the surface as determined by the gain function is small as compared to a total vertical movement potential of the probe tip.

27. The method of moving the probe tip in a scanning probe microscope of claim 23 wherein the steps thereof include the steps of:
   a) saving data from previous data points;
   b) at each point where the probe tip is to be lifted looking at the saved data at points near the present point; and,
   c) using the data from the previous nearby points to determine the gain function.

28. The method of moving the probe tip in a scanning probe microscope of claim 22 wherein:
   a) said step of gathering the data comprises gathering a multiple number of data points during each jump; and additionally comprising the step of,
   b) using only the data point closest to the surface of the multiple data points gathered during each jump to construct the image.

29. The method of moving the probe tip in a scanning probe microscope of claim 22 wherein the steps thereof include the steps of:
   a) checking surface data gathered to see if the surface is rising or falling in the lateral direction the probe tip is moving; and,
   b) raising the gain when the surface is rising compared to when it is falling.

30. The method of moving the probe tip in a scanning probe microscope of claim 22 wherein the steps thereof include the steps of:
   a) when surface property information realted to the vertical position of the probe with respect to the surface decreases below a pre-established theshold value, increasing gain of the feedback loop to a high value so as to pull the probe tip away from the surface rapidly; and,
   b) when surface property information related to the vertical position of the probe with respect to the surface exceeds the pre-established threshold value, decreasing gain of the feedback loop to a low value so as to lower the probe tip towards the surface slowly.

* * * * *